United States Patent [19]

Rieke

[11] Patent Number: 4,770,348
[45] Date of Patent: Sep. 13, 1988

[54] DISPENSER ASSEMBLY FOR SEMI-LIQUID SPREADER

[75] Inventor: David M. Rieke, Celina, Ohio

[73] Assignee: New Idea Corporation, Coldwater, Ohio

[21] Appl. No.: 463,306

[22] Filed: Feb. 2, 1983

[51] Int. Cl.⁴ ............................................. A01C 3/06
[52] U.S. Cl. ................................. 239/662; 239/665; 239/672; 239/681; 239/689
[58] Field of Search ................ 239/172, 665, 666, 661, 239/662, 670, 672, 681, 687, 689, 676; 222/504, 561, 559, 560

[56] References Cited

U.S. PATENT DOCUMENTS

| | | | |
|---|---|---|---|
| 1,508,210 | 9/1924 | Bangert | 239/666 |
| 3,396,912 | 8/1968 | Sahlstrom | 239/665 |
| 3,420,452 | 1/1969 | Vaughan | 239/666 |

FOREIGN PATENT DOCUMENTS

| | | | |
|---|---|---|---|
| 108078 | 4/1964 | Netherlands | 239/681 |
| 989895 | 5/1976 | Canada | 239/172 |
| 2080662 | 2/1982 | United Kingdom | 239/676 |

*Primary Examiner*—Andres Kashnikow
*Attorney, Agent, or Firm*—Lockwood, Alex, Fitzgibbon & Cummings

[57] ABSTRACT

A sliding gate type outlet port for a semi-liquid manure spreader is presented. The spreader with which the gate is used has an open topped tank of triangular cross section supported on a tractor drawn trailer. The power takeoff from the tractor is coupled to a shaft extending internally the length of the tank near the bottom. At the rear wall of the tank the shaft is coupled to a centrifugal pump which communicates with the tank and flings manure received therefrom in an arc away from a discharge opening in the pump housing. A hydraulically actuated flow regulating gate slides fore and aft across the pump exit port. The horizontal movement of the gate in a support structure allows an opening of constant height to be maintained while varying the area of the discharge opening, thus providing constant spread width under various settings of deposition density.

2 Claims, 3 Drawing Sheets

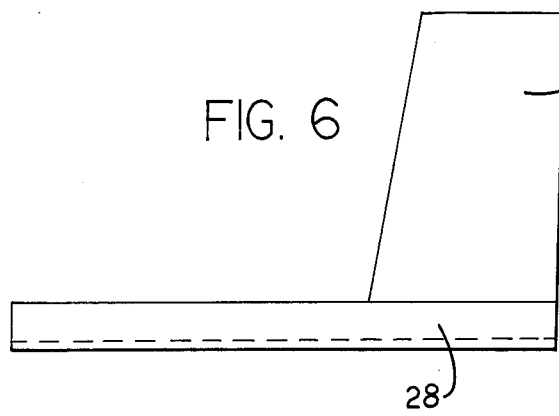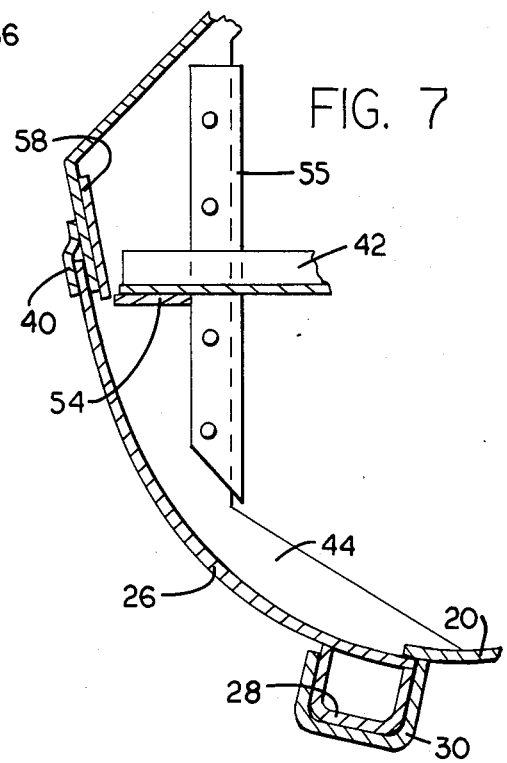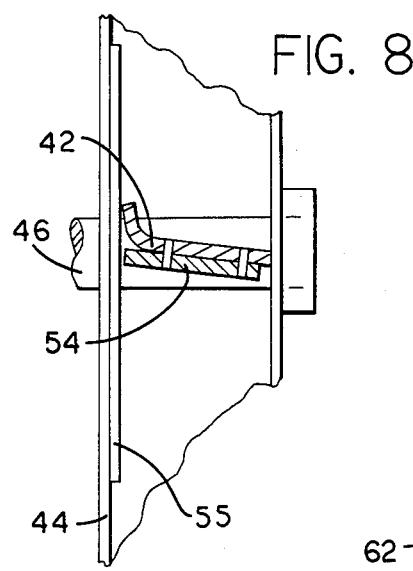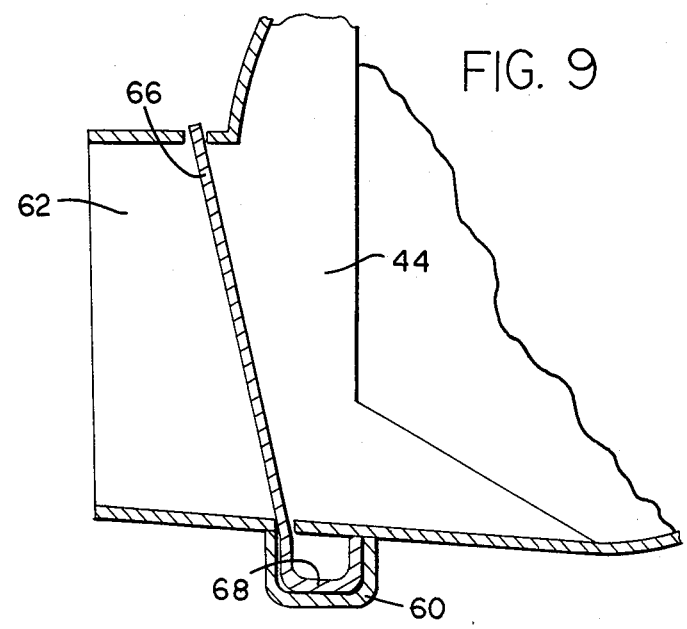

DISPENSER ASSEMBLY FOR SEMI-LIQUID SPREADER

BACKGROUND OF THE INVENTION

This invention relates to a dispenser assembly through which semi-liquid manure is expelled from the spreader onto a field. The spreader with which the dispenser assembly is used has an open topped tank allowing use of power loading equipment. Texture of the manure varies from a slurry to a semi-solid containing fibrous vegetable matter. It is important that the distribution pattern from the spreader be even across the field for a continuum of spread rate conditions.

Several manure spreading machines exist in the art. Some are designed for spreading liquid manures. Others are designed for spreading fibrous manure solids. The U.S. Pat. No. to Vaughn (3,420,452) shows one approach for handling liquid manure. Vaughan discloses a cylindrical tank supported on its side by a tractor drawn trailer. The power takeoff from the tractor is coupled to a shaft which penetrates the front end of the tank near the bottom. The shaft runs the length of the tank leaving at the lower rear wall where it serves as the drive for a centrifugal pump. That portion of the shaft on the inside of the tank includes an auger mechanism for continuously stirring the liquid manure slurry. The tank is filled by means of a hatch on the top. A discharge port near the bottom of the rear wall of the tank allows liquid manure to enter the centrifugal pump. The blades of the impeller fling the manure slurry a considerable distance in an arc away from the aperture in the pump housing.

My copending application having Ser. No. 372,423, now abandoned, describes a flail auger assembly for a spreader of the same general configuration as that on which this invention is implemented. The spreader has an open topped V-shaped tank supported on a tractor drawn trailer. The power takeoff of the tractor is coupled to a shaft which penetrates the front end of the tank near the bottom of the converging generally V-shaped sides. The shaft continues the length of the tank exiting near the bottom of the rear wall where it serves as the drive for the expeller pump.

The V-Model spreader produced by Martin Manufacturing Company of Myerstown, Pa. discloses a prior art approach for gating semi-liquid manure into the expeller pump. There is a hydraulically actuated sliding gate between the end of the tank and the expeller pump. The gate comprises two flat plates, each of which has a semicircular notch along its innermost edge. In the closed position, the plates abut the central shaft of the pump, thereby stopping flow of the slurry-like manure into the pump. The gate is opened by sliding the plates endwise away from each other along slots. The rate of flow from tank to pump is thus a function of the amount of separation between plates. Control of flow into the expeller pump in this manner results in variations in spread patterns of manure onto the field depending on the particle size and slurry consistency.

My invention solves this problem by providing a control gate which is mounted externally at the exit opening of the expeller pump. By moving the gate horizontally across the exit opening, a constant height expeller orifice is maintained. As a result there is a nearly uniform distribution of manure particles out onto the ground along a path of constant width while allowing the size of the gate opening to regulate density of deposition.

SUMMARY OF THE INVENTION

The object of this invention is to reliably and uniformly spread semi-liquid manure from the holding tank onto a field. As implemented, the spreader consists of a tank of generally triangular cross section supported on its narrow base by a tractor drawn trailer. The tank is open at the top and has vertical end walls. The power takeoff of the tractor is coupled to a shaft which penetrates the front wall of the tank near the bottom. The shaft extends the length of the tank exiting through a port in the lower rear wall to drive the impeller of a radial flow pump. That portion of the shaft which is on the inside of the tank has incorporated thereon a heavy duty agitator and conveyor for delivering product from the tank to the expeller pump.

The expeller pump comprises a generally cylindrical housing having a diameter of 18 to 20 inches. Within the housing is a multi-bladed fan, each blade being about 4 inches wide. The fan rotates clockwise as viewed from the rear. For this rotation, the exit port from the pump comprises generally, the lower left quadrant allowing manure to be flung sideways in an arc outwardly from the rear of the machine. A flow regulating gate slides fore and aft across the exit port of the pump. The gate is curved to fit the circumferential contour of the outside of the pump. A rod of U-shaped cross section is attached at its first end to the bottom edge of the gate. The second end of the rod is attached to one end of a hydraulic cylinder. The second end of the hydraulic cylinder is secured to the frame of the spreader. Thus, when the cylinder is extended, the gate opens. When the cylinder is fully retracted the gate is closed. At intermediate values, the gate will be partially open.

Placing the gate at the exit port of the pump has several benefits. First, it allows the port between the tank and the inlet to the pump to be optimally shaped. The inlet port can be shaped both for ease of delivery of manure into the pump and at the same time there can be provisions included to prevent entanglement of twine and fibrous weed stalks. Second, a major functional advantage of this external gate is the horizontal movement of the gate. A gate with horizontal movement allows an opening of constant height to be maintained while varying the area of the opening. This constant height allows a near uniform distribution of manure onto the ground while varying the density of deposition. Tests show that varying the vertical size of the opening promotes varying spread widths while a constant vertical opening provides more constant spread widths. Third, the gate implemented according to the principles of my invention is fully accessible, never encounters internal obstructions and allows the actuating hydraulic cylinder to be installed in a protected location.

BRIEF DESCRIPTION OF THE DRAWINGS

FIG. 6 is a side view of an alternate form of the outlet gate wherein the leading edge is tapered.

FIG. 7 is a partial rear view of the expeller pump wherein shear bars have been added.

FIG. 8 is a partial side view of the FIG. 7 pump.

FIG. 9 is a partial rear view of an alternate expeller pump having the housing thereof built to accommodate a flat outlet gate.

DESCRIPTION OF THE PREFERRED EMBODIMENT

Figure 1:
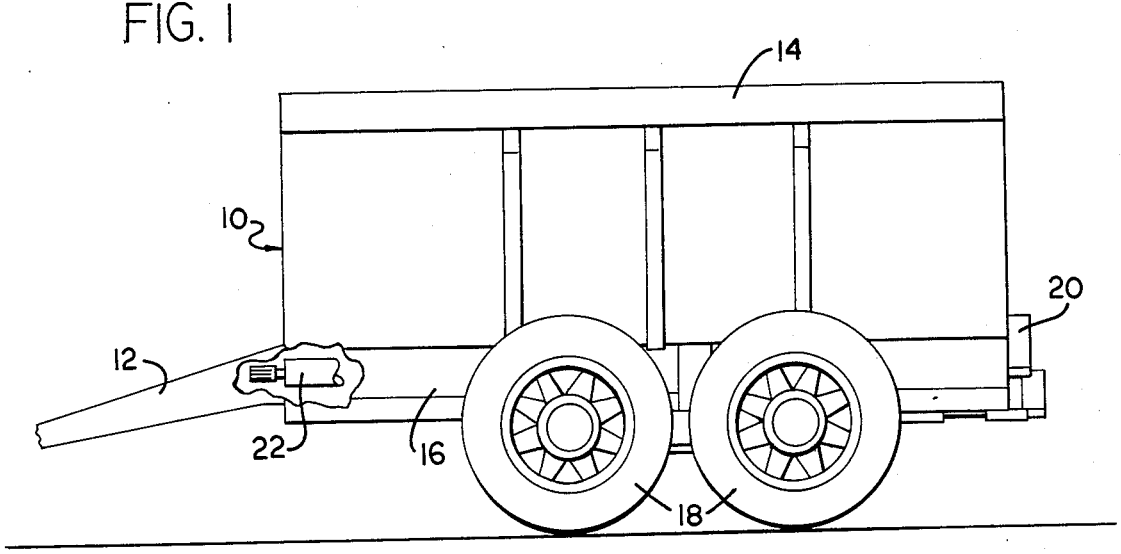
FIG. 1 is a side view of a spreader of which the dispenser assembly forms a part.
Figure 2:
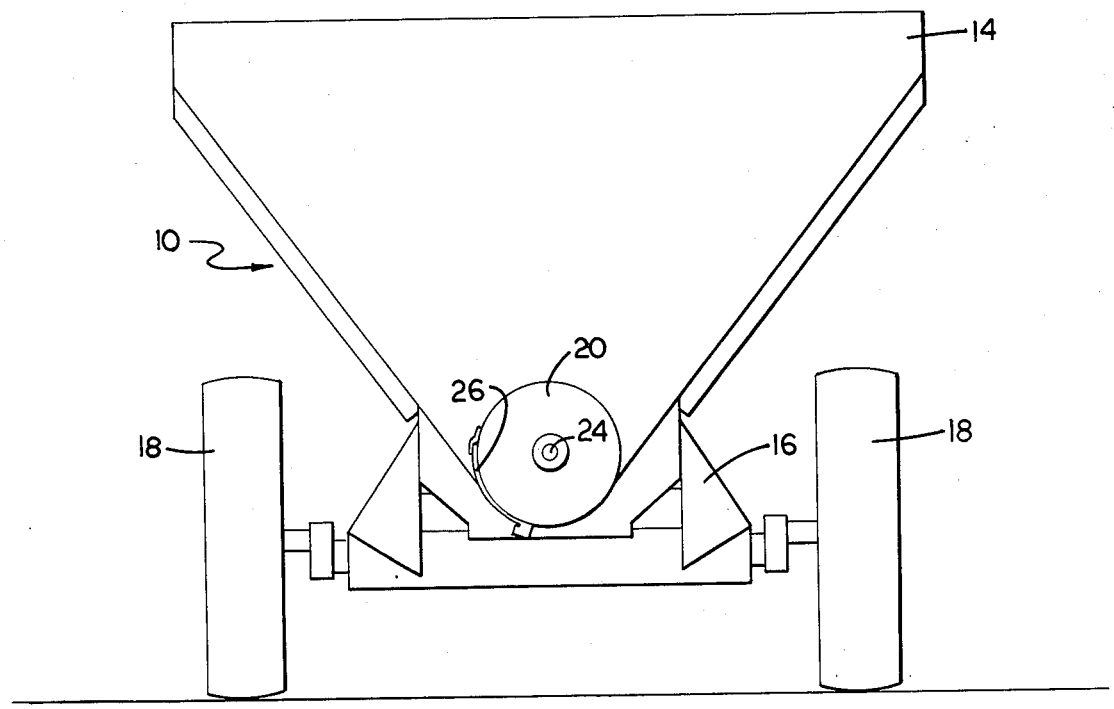
FIG. 2 is a rear view of the FIG. 1 spreader showing the position of the gate at the lower left quadrant of the expeller pump.

FIGS. 1 and 2 show the semi-liquid type manure spreader which utilizes the dispenser assembly. FIG. 1 shows a spreader 10 which attaches by means of a drawbar hitch 12 to a tractor (not shown). Spreader 10 has a holding tank 14 mounted on a chassis 16 which is carried on tandem wheels 18. Mounted near the bottom of the rear wall of tank 14 is a centrifugal expeller pump 20. The impeller blades of pump 20 fling the manure sideways away from the spreader in a leftward direction as viewed in FIG. 2. Expeller pump 20 is powered by shaft 22 which receives its torque from the power take-off shaft of the tractor. Shaft 22 (see cutout of FIG. 1) extends the length of the tank 14. There are bearing supports at each end of shaft 22. One of these supports will be at the front wall of tank 14. The rearmost support will be at the outer wall of pump 20 (see bearing support 24 in FIG. 2). The casing of pump 20 communicates with the inside of tank 14 by means of a port cut through the rear wall of the tank.

In the unit reduced to practice shaft 22 was a hollow pipe having a diameter of approximately 5 inches. That portion of the shaft which is on the inside of the tank has incorporated thereon a heavy duty agitator and conveyor. Rotation of the shaft both stirs the liquid manure within the tank and urges it to exit through the port communicating with the expeller pump. Attention must be given to configure the agitator in a way which will prevent bridging of the material within the tank.

Figure 3:
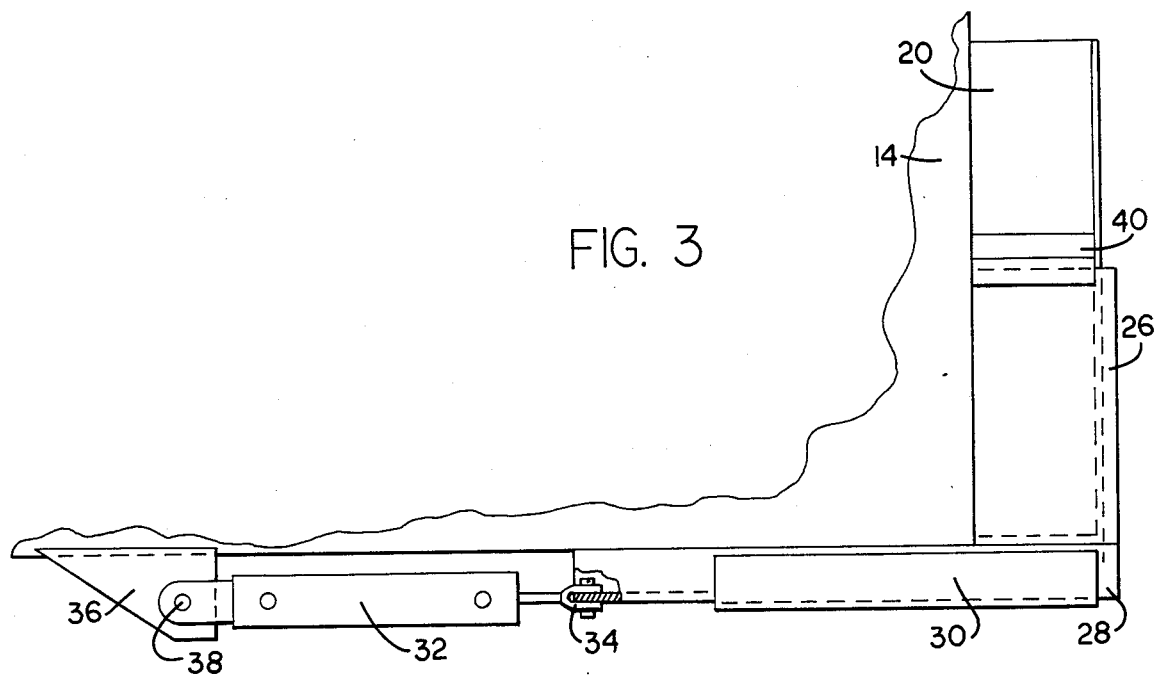
FIG. 3 is a side view of the expeller pump showing the gate in the closed position.
Figure 4:
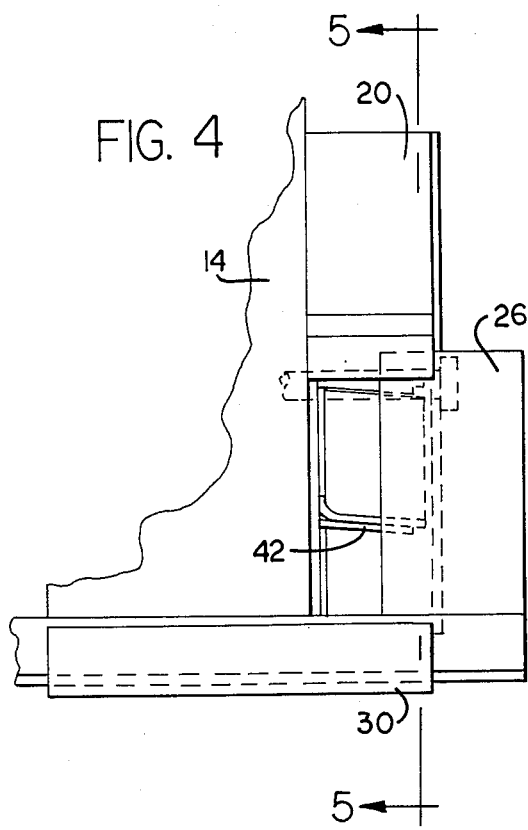
FIG. 4 is a side view of the pump showing the gate in a partially open position.
Figure 5:
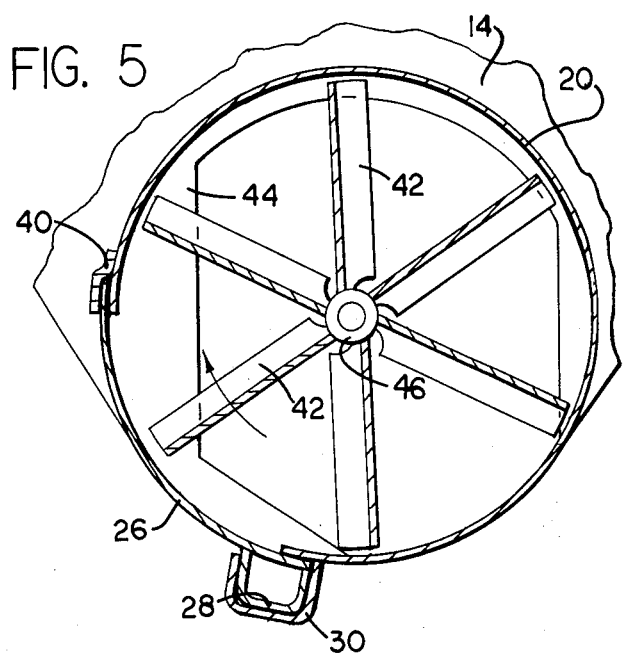
FIG. 5 is a rear view of the expeller pump taken along line 5—5 of FIG. 4.

FIGS. 3, 4 and 5 show how the dispenser assembly is incorporated into the semi-liquid spreader. FIG. 3 is an enlarged view of the lower rear portion of tank 14. Expeller pump 20 extends beyond the rear wall of the tank. Flow regulating gate 26 completely covers the exit port of expeller pump 20. As may be seen in FIG. 5, flow regulating gate 26 is curved to fit the circumferential contour of the outside cylindrical wall of pump 20. A rod 28 of U-shaped cross section (See FIGS. 3 and 5) is attached as by welding to the lower edge of gate 26. Rod 28 is configured to slide endwise in complemental shaped trough 30. Trough 30 is attached along its one edge to the bottom of tank 14. Attachment may be by welding. The top of gate 26 is held in place by overlapping bracket 40 which may be spot welded to the face of pump 20.

The second end of rod 28 is secured by bolt and clevis means 34 to the first end of hydraulic cylinder 32. The second end of hydraulic cylinder 32 is rotatably secured by pin 38 to bracket 36 which may be welded in place to either the frame of the spreader or the bottom of tank 14. When the hydraulic cylinder 32 is retracted (See FIG. 3), gate 26 is completely closed. When the hydraulic cylinder is fully extended, gate 26 slides rearward to a wide open value. For an intermediate value of extension, gate 26 will assume the position depicted in FIG. 4.

Typical dimensions of the assembly that was reduced to practice were as follows. Gate 26 was formed from one quarter inch thick stock 5.5 inches wide and 14.625 inches long. The arc of curvature conformed to a circle of radius 9.6875 inches. This gate was utilized with an expeller pump housing having an inside diameter of 19 in. A typical length for rod 28 is 18 inches.

Placing flow regulating gate 26 at the exit port of pump 20 accomplishes several desirable results. First, it allows optimization of the pump itself. The configuration of the inlet port 44 made in the rear wall of the tank (See FIG. 5) can be optimized. The shape of the fan blades 42 can also be chosen so as to best cooperate with the configuration of port 44. In the system reduced to practice, a six bladed fan was used. All blades 42 were alike and each extended radially outward from a hub 46 secured to shaft 22. That edge of the blade nearest the inlet port 44 had a shear bar edge (See FIG. 4) which functioned in combination with the varying effective radius of inlet port 44 to prevent entangling buildups of twine and fibrous weed stalks. This shearing action may be seen by following the changing interface between the forward most edge of a blade 42 and port 44 as the blade rotates from the bottom most part of the pump chamber to the top.

A second major functional advantage of my invention is the constant width of the spread pattern. Horizontal movement of gate 26 provides a pump outlet orifice of constant height for all fractional openings of the gate. This constant height outlet port situation allows a near uniform distribution of manure on the ground for a multiplicity of density settings.

For some implementations, it may be desirable to spread in a non-uniform manner. FIG. 6 shows how this can be achieved. Instead of the rectangular gate 26 shown in FIGS. 3 and 4, alternate gate 56 is generally of a trapezoidal shape. When slid open in the manner depicted in FIG. 4, the alternate gate 56 will uncover the top of the exit port first. For all positions of hydraulic cylinder 32 acting on rod 28, the width of the exit port opening at the top will exceed that at the bottom. In the closed position the bottom most part of alternate gate 56 slides forward past the outer edge of tank 14.

The configuration of inlet port 44 does not have to be symmetrical with respect to the center shaft 22 as is the case for the twin sliding gates of the prior art machine. This makes it possible to incorporate the slightly offset input port 44 of FIG. 5. With an offset port 44 such as is shown in FIG. 5, consideration can be given to equal charging between adjacent fan blades, maintenance of even pressure across the span of the blade at the outlet port and incorporation of a self cleaning action.

Incorporation of means for enhancing the self cleaning action of the pump is shown in FIGS. 7 and 8. In FIG. 7, a shearing action between plates 54 and 58 prevent buildup of twine and other fibrous material at the exit port of expeller pump 20. A shear plate 54 is attached to at least one of the fan blades 42. A second small rectangular shear plate 58 is attached to the circumferential surface of pump 20. Plate 58 may be attached by bolts. There may be rectangular slots in plate 58 to allow the finite adjustment of the spacing between plates 54 and 58. The facing of inlet port 44 is shown as having mounted thereon a shear bar 55. Shear bar 55 interfaces with the inward facing edge of fan blade 42 and the end of shear plate 54 (See FIG. 8). The introduction of shear plates 54 and 58 together with shear bar 55 does not change the operation of gate 26 at the exit port of the pump.

An alternate version of the gate is shown in FIG. 9. In the FIG. 9 implementation a chute 62 has been added to the exit port of the pump. Addition of chute 62 makes it possible to configure gate 66 as a flat plate. Rod 68 attached at the bottom edge of gate 66 operates in the same manner as rod 28 in the configuration shown in FIG. 5. Similarly, U-shaped element 60 performs the same function as does trough 30 in the earlier described implementation. Gate 66 slides horizontally across the exit port enclosed by chute 62.

Finally, gates implemented as shown in FIGS. 3-9 are both simple and reliable. All parts are readily inspected for functional integrity and the hydraulic components are mounted in protected environments. Thus, it can be seen that the invention as reduced to practice is an improvement on the prior art.

I claim:

1. A flow regulating dispenser assembly for a semi-liquid manure spreader having an open topped, trailer mounted holding tank with front and rear end walls, said spreader being drawn and powered from an external source, said external source being coupled through the front wall of said tank to the first end of a rotatable shaft extending the length thereof near the bottom, that portion of said shaft on the inside of said tank having incorporated thereon an agitator and conveyor for delivering product from the tank to the dispenser assembly, said dispenser assembly comprising:

an expeller pump having a housing of generally cylindrical shape secured to and projecting from the rear wall of said tank near the bottom thereof, the external outer wall of said housing being closed, said pump including a multibladed impeller fan having a center hub mounted for rotation within said housing, the diameter of said fan blades being substantially equal to the inside diameter of said housing, the axis of said hub and said shaft being coextensive, the outer wall of said housing serving as a bearing support for the second end of said shaft;

an inlet port in the rear wall of said tank allowing communication between said tank and said expeller pump, the configuration of said port acting cooperatively with the forwardmost edges of said multibladed fan to provide a self cleaning action;

an exit port in the housing of said expeller pump for discharging semi-liquid products therefrom, said exit port comprising generally, the lower left quadrant of the circumferential contour of said generally cylindrical housing allowing product to be flung sideways in an arc away from the rear of said spreader;

a gate sized to cover the exit port of said pump, said gate being shaped to conform to the outermost contour of said generally cylindrical housing;

a support structure for holding said gate in contact with the facing of said exit port but simultaneously allowing said gate to be slidably moved in a horizontal direction parallel to the axis of said fan for selectively uncovering a uniform height of said exit port; and actuating means for slidably moving said gate to any of a multiplicity of specified partially open or closed conditions.

2. The invention as defined in claim 1 wherein the actuating means includes a hydraulic cylinder having its one end arranged to be coupled with the bottom edge of said gate and its second end secured to a frame of the spreader.

* * * * *